(12) United States Patent
Filippov et al.

(10) Patent No.: US 10,619,457 B2
(45) Date of Patent: Apr. 14, 2020

(54) OPTIMIZING FLOW CONTROL DEVICE PROPERTIES FOR A LIQUID INJECTION WELL USING A COUPLED WELLBORE-RESERVOIR MODEL

(71) Applicant: Landmark Graphics Corporation, Houston, TX (US)

(72) Inventors: Andrey Filippov, Houston, TX (US); Jianxin Lu, Bellaire, TX (US); Vitaly Khoriakov, Calgary (CA)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 283 days.

(21) Appl. No.: 15/033,572

(22) PCT Filed: Nov. 15, 2013

(86) PCT No.: PCT/US2013/070398
§ 371 (c)(1),
(2) Date: Apr. 29, 2016

(87) PCT Pub. No.: WO2015/073030
PCT Pub. Date: May 21, 2015

(65) Prior Publication Data
US 2016/0281472 A1 Sep. 29, 2016

(51) Int. Cl.
*E21B 43/25* (2006.01)
*E21B 41/00* (2006.01)
(Continued)

(52) U.S. Cl.
CPC .......... *E21B 41/0092* (2013.01); *E21B 43/16* (2013.01); *E21B 43/20* (2013.01);
(Continued)

(58) Field of Classification Search
CPC .. G01V 1/288; G01V 1/362; G01V 2210/123; E21B 41/0092; E21B 43/16; E21B 43/20; E21B 47/06; G01F 1/00
See application file for complete search history.

(56) References Cited

U.S. PATENT DOCUMENTS

| 8,195,401 B2 * | 6/2012 | Ella .................. G06Q 50/06 702/13 |
| 2002/0121371 A1 * | 9/2002 | Moake ................ E21B 43/12 166/250.07 |

(Continued)

FOREIGN PATENT DOCUMENTS

| EP | 0806718 A1 | 11/1997 |
| WO | WO-2015016932 A1 | 2/2015 |

OTHER PUBLICATIONS

International Search Report and Written Opinion, dated Aug. 18, 2014, 9 pages, Korean Intellectual Property Office.
(Continued)

*Primary Examiner* — Jarrett J Stark

(57) ABSTRACT

The disclosed embodiments include a method, apparatus, and computer program product for determining optimal flow control device (FCD) properties that would yield to a prescribed shape of the injection flow rate profile. For example, in one embodiment, a computer implemented method is configured to perform the steps of: determining a reference location along a production length of the injection well; determining a reference value equal to the injection flow rate profile at the reference location along the production length of the injection well; defining a target injection profile using the reference value; determining a pressure distribution along the production length of the injection well based on the target injection profile; determining a FCD distribution profile using the target injection profile and the pressure distribution; and determining FCD properties that
(Continued)

yields the target injection profile based on the FCD distribution profile.

20 Claims, 7 Drawing Sheets

(51) Int. Cl.
    *E21B 43/16*     (2006.01)
    *E21B 43/20*     (2006.01)
    *E21B 47/06*     (2012.01)
    *G01F 1/00*     (2006.01)
    *G01F 1/74*     (2006.01)

(52) U.S. Cl.
    CPC ............... *E21B 47/06* (2013.01); *G01F 1/00* (2013.01); *E21B 43/255* (2013.01); *G01F 1/74* (2013.01)

(56) References Cited

U.S. PATENT DOCUMENTS

| | | | |
|---|---|---|---|
| 2005/0038603 A1 | 2/2005 | Thomas et al. | |
| 2010/0126717 A1* | 5/2010 | Kuchuk | E21B 49/008 166/250.03 |
| 2010/0236637 A1 | 9/2010 | Hendrix, Jr. | |
| 2011/0079387 A1* | 4/2011 | Russell | E21B 43/12 166/250.15 |
| 2012/0278053 A1 | 11/2012 | Garcia et al. | |
| 2013/0213652 A1 | 8/2013 | Stalder | |
| 2016/0273316 A1* | 9/2016 | Filippov | E21B 43/12 |
| 2016/0281494 A1* | 9/2016 | Shirdel | E21B 43/24 |

OTHER PUBLICATIONS

Su, Ho-Jeen and Dogru, Ali H., Modeling of Equalizer Production System and Smart-Well Applications in Full-Field Studies, 2007 SPE/EAGE Reservoir Characterization and Simulation Conference, Oct. 28-31, 2007, 11 pages, SPE 111288, Society of Petroleum Engineers, Abu Dhabi, UAE.

Sarma, P. and Aziz,K., Implementation of Adjoint Solution for Optimal Control of Smart Wells, 2005 SPE Reservoir Simulation Symposium, Jan. 31, 2005-Feb. 2, 2005, 17 pages, SPE 92864, Society of Petroleum Engineers, Houston, Texas.

Sharma, A., Kok, J.C., Neuschaefer R., Han, S.Y., Bieltz, T., Obvintsev A. and Riegler, P., Integration of Dynamic Modeling of ICD Completion Design and Well Placement Technology: A Case Study of GOM Shelf Reservoir, SPE Annual Technical Conference and Exhibition, Oct. 30-Nov. 2, 2011, 12 pages, SPE 146454, Society of Petroleum Engineers, Denver, Colorado.

Thornton, Kim, Jorquera, Ricardo and Soliman, M.Y., Optimization of Inflow Control Device Placement and Mechanical Conformance Decisions Using a New Coupled Well-Intervention Simulator, Nov. 11-14, 2012, 13 pages, SPE 162471, Society of Petroleum Engineers, Abu Dhabi, UAE.

\* cited by examiner

OPTIMIZING FLOW CONTROL DEVICE PROPERTIES FOR A LIQUID INJECTION WELL USING A COUPLED WELLBORE-RESERVOIR MODEL

BACKGROUND OF THE INVENTION

1. Field of the Invention

The present disclosure relates generally to the recovery of subterranean deposits and more specifically to methods and systems for optimizing the placement and other properties of one or more flow control devices along a liquid injection well for the purpose of improving recovery from a reservoir.

2. Discussion of the Related Art

Liquid injection refers to the method in the oil industry where fluid (usually water) is injected into the reservoir, to increase pressure and stimulate production. For example, in certain instances, the water replaces the oil which has been taken, thus, maintaining the production rate and the pressure over the long term. In addition, in certain situations, the water displaces or sweeps oil from the reservoir and pushes it towards a well. Liquid injection wells can be found both on and off shore to increase oil recovery from an existing reservoir.

However, liquid injection wells frequently suffer from imbalanced placement of the injected fluid due to one or more of the zones accepting excessive injection rates and volume. The primary reason for this is permeability differences or thief zones along the well bore. With imbalances in the injection rates, problems can arise including ineffective reservoir drainage and early breakthrough of injected fluid into producers. Thus, solutions are needed to overcome the imbalanced placement of the injected fluid.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

Figure 1:
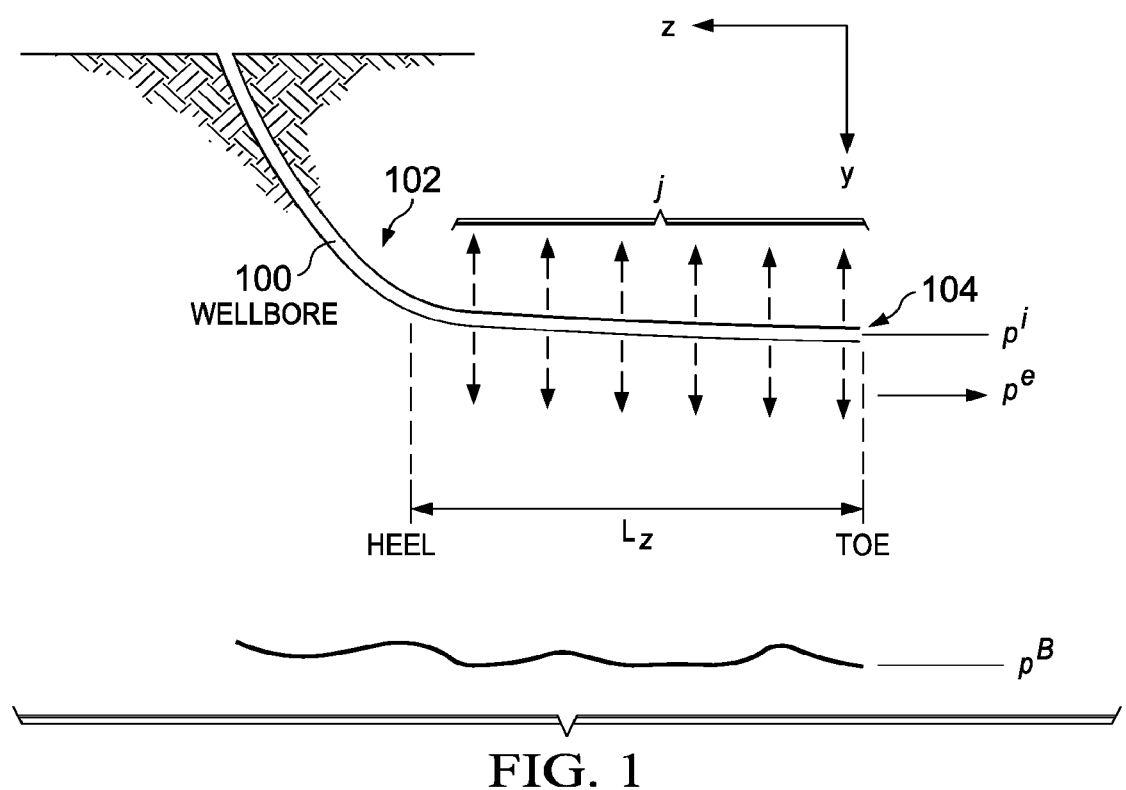
FIG. 1 is a diagram depicting a typical scheme of a horizontal injection well in accordance with the disclosed embodiments.

As stated above, liquid injection wells frequently suffer from imbalanced placement of the injected fluid due to one or more of the zones accepting excessive injection rates and volume. In accordance with the disclosed embodiments, one method to counter this imbalance is to use one or more flow control devices (FCDs) along the injection well to balance the fluid injected into the formation. As referenced herein, a flow control device (FCD) is any device that is coupled to a wellbore that causes a pressure drop between the wellbore and a reservoir to reduce flow between the wellbore and the reservoir at the location of the flow control device. For instance, in certain embodiments, an inflow control device (ICD), as known in the art, may be used in connection with an injection well to balance the fluid injected into the formation. In this case, the ICD would act as an injection control device, as opposed to an inflow control device, as it would perform the reverse action of controlling flow of the injected fluid from the base pipe to the annulus. A non-limiting example of a FCD in accordance with the disclosed embodiments is the EquiFlow® Inject system available from Halliburton®.

To achieve a desired injection profile from long horizontal wells, the completion design must account for the high pressure drawdown from heel to toe and must also account for the reservoir heterogeneity. Two key factors in being able to create the desired injection profile using FCDs are proper selection of the FCDs (e.g., number of holes and hole diameter sizes) and proper placement of the selected FCDs along the injection well.

However, to date, no easy methods for determining proper placement or selection of FCDs have been developed. Instead, current methods rely on a manual trial and error process in which various sizing/types and placement of FCDs are simulated along a horizontal well using simulation software such as NETool™ available from Landmark Graphics Corporation.

Accordingly, the disclosed embodiments seek to improve the process of determining FCD properties to achieve a desired injection profile for a particular injection well. In accordance with the disclosed embodiments, the FCD properties include, but are not limited to, the number and types of FCDs for a wellbore, the placement of the various FCDs along the wellbore, and the number of holes and the diameters/flow sizes of the holes for each of the various FCDs. In particular, in contrast to the current manual trial and error process, the disclosed embodiments propose the use of a numerical algorithm and simulation approach for calculating the optimal FCD properties that would yield to a prescribed injection flow rate profile such as, but not limited to, a uniform injection profile along the wellbore.

The disclosed embodiments and advantages thereof are best understood by referring to FIGS. 1-7 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. The embodiments were chosen and described to explain the principles of the invention and the practical application, and to enable others of ordinary skill in the art to understand the claimed inventions.

Beginning with FIG. 1, a diagram depicting a typical scheme of a horizontal injection well 100 is presented. The injection well 100 includes an upstream end 102 and downstream end 104. The upstream end 102 is known in the art as the heel of the well and the downstream end 104 is known as the toe. In addition, several properties described herein are also indicated on FIG. 1. In particular, z is the horizontal coordinate; $L_z$ is the wellbore length; $P^i$ is the wellbore pressure, $P^e$ is the annulus pressure, $P^B$ is the reservoir boundary pressure, j is the volumetric flow rate of injected liquid per unit length of the wellbore (e.g., number of gallons per meter).

In accordance with the disclosed embodiments, the flow of liquid in the wellbore is described by the following coupled equations.

$$\frac{dp}{dz} = \frac{j}{S}, \quad j = \frac{2\pi k}{\mu} \frac{p^e(z) - p^B}{\ln\left(\frac{r_B}{r_0}\right)} \quad \text{(Equation 1)}$$

$$\frac{dp}{dz} = \frac{f_d}{2D}\rho |V| V + \frac{2\rho V j}{S} + \rho g_z \quad \text{(Equation 2)}$$

$$j^2 = \frac{f(z)}{\sigma}[p^i(z) - p^e(z)] \quad \text{(Equation 3)}$$

Equation 1 is the continuity equation and Equation 2 is the momentum balance equation, where V is the average flow velocity, S and D are the wellbore cross-section area and diameter, $\mu$, $\rho$ and k are the viscosity, density and formation permeability, and $r_B$ and $r_0$ are the radial coordinates of the reservoir boundary and the wellbore surface, $g_z$ is the gravity acceleration along z direction, and $f_d$ is the Darcy friction coefficient. By accounting for the variation of reservoir formation properties and fluid properties, the disclosed embodiments have wide potential applications for different reservoir conditions.

The formation permeability k is a product of $k_0$ and $k_r$, where $k_0$ is the Darcy permeability and $k_r$ is the relative permeability, which depends on the saturation of the rock with original and injected liquids. In one embodiment, for fixed values of z, these properties are assumed to be constant, but may vary along the wellbore with coordinate z. In certain embodiments, as will be described below, for simplicity reasons, an assumption is made that water fully displaces oil in the rock and therefore $k_r$ is constant before and after the injection front while experiencing a jump at the front location. Alternatively, in certain embodiments, $k_r$ will depend on saturations for every grid block of the simulation.

Equation 3 describes the dependence of the fluid flux on the pressure difference between the flow in wellbore and the formation, where j is the injected flux and $\sigma$ is the flow resistance coefficient. The function f(z) characterizes the longitudinal variation of hole diameter or linear density of the FCDs. An increase in the results of the function f(z) causes a reduction of the pressure drop across the FCD wall and therefore increasing the influx of fluids.

The variable $f_d$ is the Darcy friction factor, which accounts for friction loss in pipe flow as well as open channel flow. In one embodiment, the Darcy friction factor is determined using the Haaland equation as shown below in Equations 4 and 5. Other equations such as, but not limited to, Colebrook-White equation, Swamee-Jain equation, and Goudar equation may also be used to determine the Darcy friction factor in accordance with the disclosed embodiments.

$$Re = \frac{\rho V D}{\mu}, \text{ where } Re \text{ is the Reynolds number.} \quad \text{(Equation 4)}$$

$$f_d = \begin{cases} 64/Re, & \text{if } Re < 2300; \\ \left\{-1.8\log_{10}\left[\left(\frac{\varepsilon/D}{3.7}\right)^{10/9} + \frac{6.9}{Re}\right]\right\}^{-2}, & \text{if } Re > 2300. \end{cases} \quad \text{(Equation 5)}$$

In one embodiment, combining the definition of j in Equation 1 and Equation 3 yields:

$$bj^2 + aj = ab[p^i(z) - p^B]$$

$$a = \frac{f(z)}{\sigma}; \; b = \frac{2\pi k_o}{\mu_o} \frac{1}{\ln\left(\frac{r_B}{r_0}\right)} \quad \text{(Equation 6)}$$

and $$j = \frac{1}{2b}\left(-a + \sqrt{a^2 + 4ab^2(p^i - p^B)}\right) \quad \text{(Equation 7)}$$

In accordance with one embodiment, the FCD distribution function f(z) is assumed equal to unity for some standard placement of FCDs, characterized by the flow resistance coefficient $\sigma$. In the simplest case, when the FCD includes holes with diameters Dor, situated at distances Lor from each other, the coefficient $\kappa$ equals to:

$$\kappa = \frac{8\rho_0 L_{or}^2(0)}{\pi^2 D_{or}^4(0)} \quad \text{(Equation 8)}$$

Thus, the flow resistance coefficient $\sigma$ can be tuned up by varying hole-to-hole distance Lor, or changing the diameter of the holes Dor. For example, when the distance Lor is fixed, the nozzle diameter will be $$D_{new} = [f(z)]^{1/4} D_{or} \quad \text{(Equation 9)}$$

By using the above equations and determined relationships, the disclosed embodiments provide a process that is able to determine the optimum FCD properties (e.g., optimal FCD placement, hole-to-hole distance, and the diameter of the holes) that would produce a desired injection profile such as an equally distributed injection flow rate or any desired shape of the FCD distribution f(z) for a particular injection well.

Figure 2:
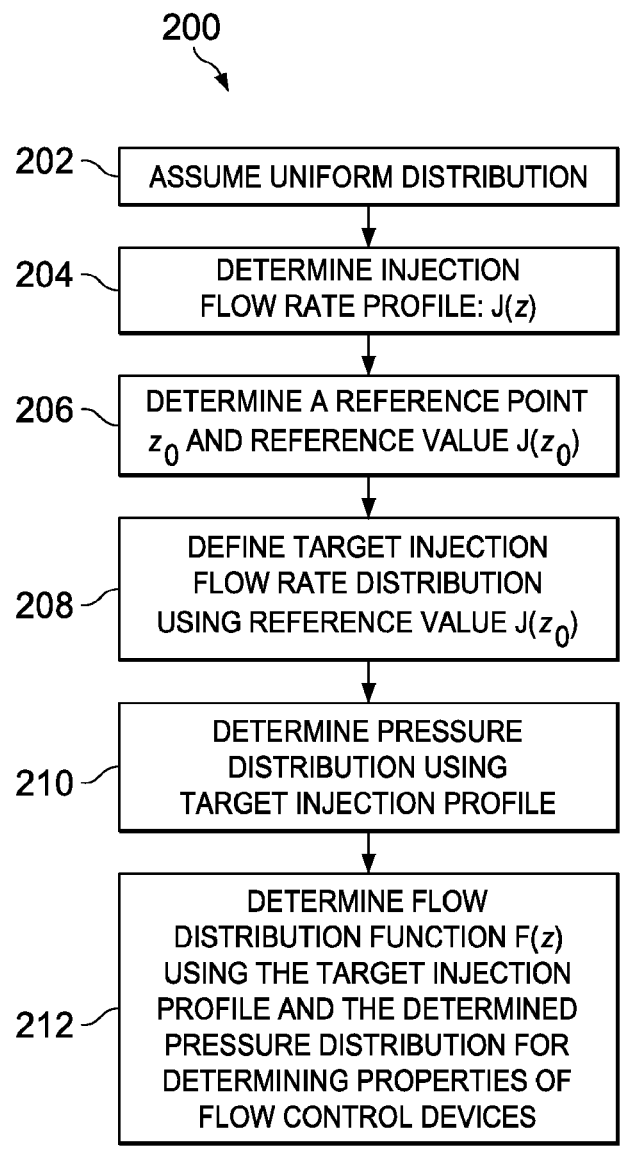
FIG. 2 is a diagram of a flowchart depicting a computer-implemented method for determining the optimum flow control device properties for achieving a desired injection profile for a particular injection well in accordance with the disclosed embodiments.

For example, FIG. 2 provides an illustration of a flowchart depicting a computer-implemented method 200 for determining the optimum FCD properties for achieving a desired injection profile for a particular injection well in accordance with the disclosed embodiments. The computer-implemented method 200 begins at step 202 by assuming a uniform flow distribution (f(z)=1) of the FCDs along the horizontal production length of the wellbore (z). The process at step 204 determines an injection flow rate profile j(z) along the horizontal production length of the wellbore using the continuity equation (Equation 1) and the momentum balance (Equation 2) as described above. For example, in one embodiment, the process calculates the integral of Equations 1 and 2 along the horizontal production length of the wellbore (z) to determine the injection flow rate profile j(z).

At step 206, the process determines a point/location $Z_0$ along the horizontal production length of the wellbore that satisfies the following condition/equation:

$$\frac{j(z_0)}{F(z_0)} = \min\left[\frac{j(z)}{F(z)}\right]; 0 \leq z \leq L_z \quad \text{(Equation 10)}$$

where function F(z) describes the desired shape of the injection flow rate distribution. The condition (10) defines a point z0 with minimum ratio of the calculated injection flow rate to its normalized target value F(z0) at that point.

At step 208, the process calculates a target injection flow rate distribution/profile using reference value $j(Z_0)$. For instance, in one embodiment, the process defines the target injection profile using the equation $j^*(Z)=j(Z_0)\cdot F(Z)/F(Z_0)$. The process at step 210 then determines the pressure drawdown distribution $[p^i(z)-p^B]$ by integrating the continuity equation (Equation 1) and the momentum balance (Equation 2) using the target injection profile $j=j^*(z)$. Finally, at step 212, the process determines the flow distribution function f(z) using the target injection profile and the determined pressure distribution for determining properties/placement of FCDs. For instance, in one embodiment, the process determines the FCD distribution function f(z) using the following equation:

$$f(z) = \frac{\sigma b j^{*2}}{b[p^i(z) - p^B]^* - j^*} \quad \text{(Equation 11)}$$

Figure 3A:
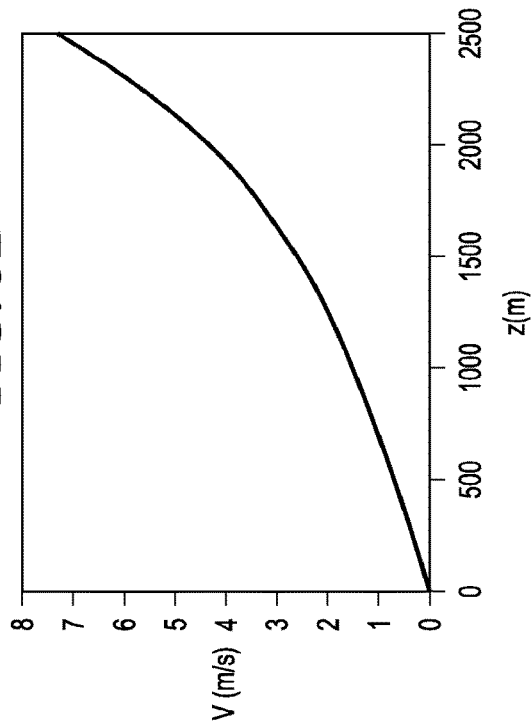
FIGS. 3A-3D are graphs that depict an example of the pressure difference, velocity, injection flow rate j profile along the wellbore, for a horizontal injection well having a constant flow distribution f(z) in accordance with the disclosed embodiments.
Figure 3B:
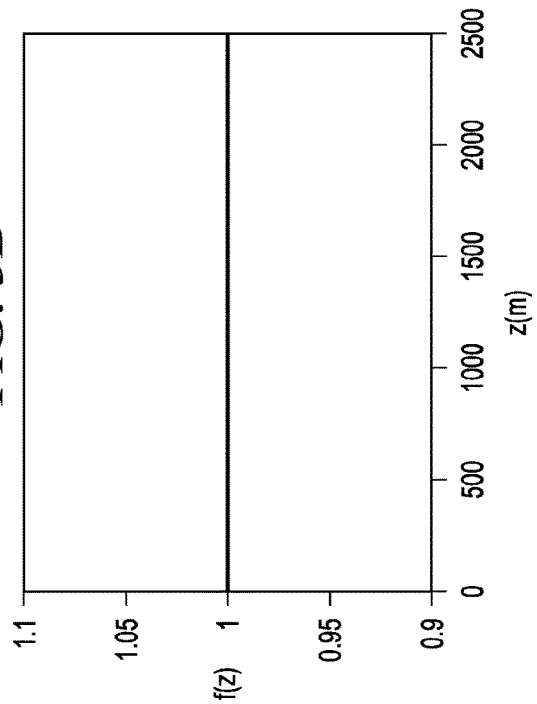
Figure 3C:
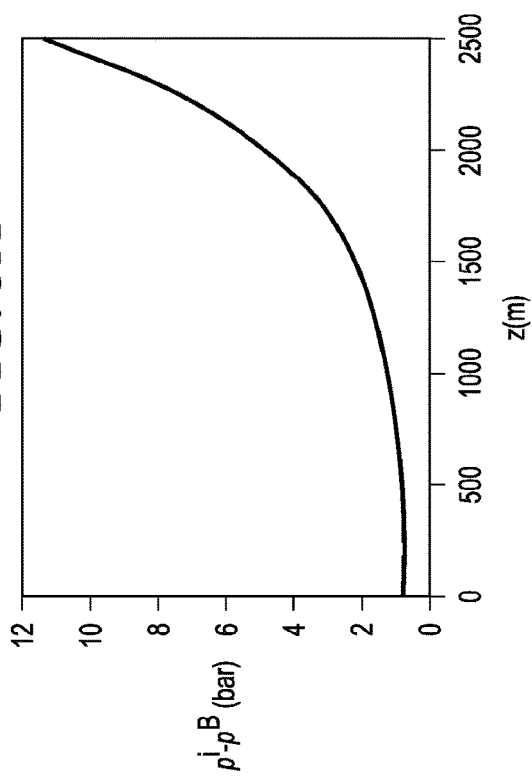
Figure 3D:
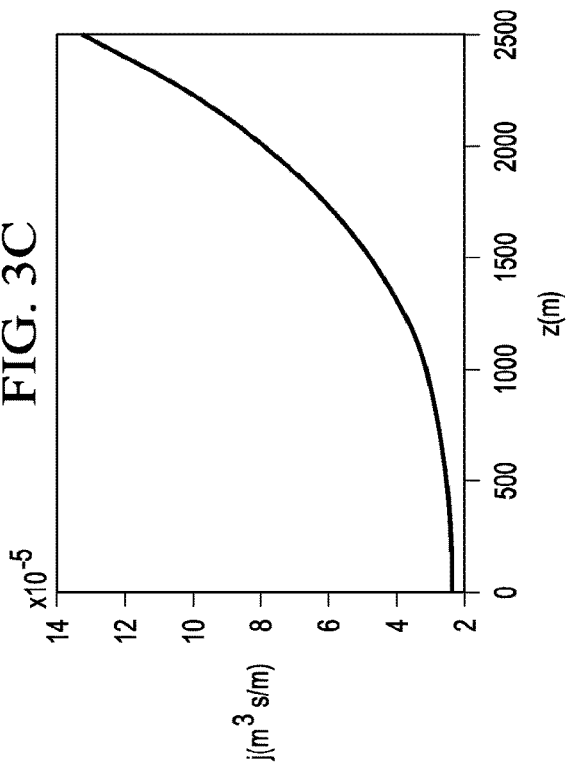

To help further describe the disclosed embodiments, FIGS. 3A-3D are graphs that depict an example of the pressure difference $p^i-p^B$, velocity V, injection flow rate j profile in the wellbore, and FCD distribution function f(z) for a horizontal injection well having a diameter 0.15 m, a length 2500 m (with z coordinate starting at the toe). In the depicted embodiment, the FCD distribution function f(z) is set constant along the wellbore (i.e., f(z)=1) as shown in FIG. 3D.

In this example, the injection fluid is assumed to be water with viscosity 10−3 Pa s, while the permeability is set to 0.5 Darcy. The FCD nozzle diameter, Dor, is 7 mm and is uniformly distributed. The reservoir boundary pressure $p^B$ is set as a constant value. Instead of using the wellbore pressure $p^i$, the depicted embodiment uses a calculated variable function for determining the pressure drawdown from the wellbore to the reservoir $(p^i-p^B)$, which is illustrated in the graph of FIG. 3A. As can be seen, both the velocity (FIG. 3B) and pressure drawdown (FIG. 3A) drop significantly from the heel (z=2500 m) to the toe (z=0 m) due to the viscous friction and the FCDs. Additionally, the injection flow (FIG. 3C) rate drops along with the length of the well as $(p^i-p^B)$ decreases. Thus, as expected, the injection fluid will have a tendency to breakthrough at the heel (z=2500 m) using a simple uniform distribution of FCDs.

FIGS. 4A-4D are graphs that depict a second example in which a uniform injection flow rate profile j is applied to a horizontal injection well and the optimum FCD placement/properties are determined in accordance with the disclosed embodiments.

Figure 4A:
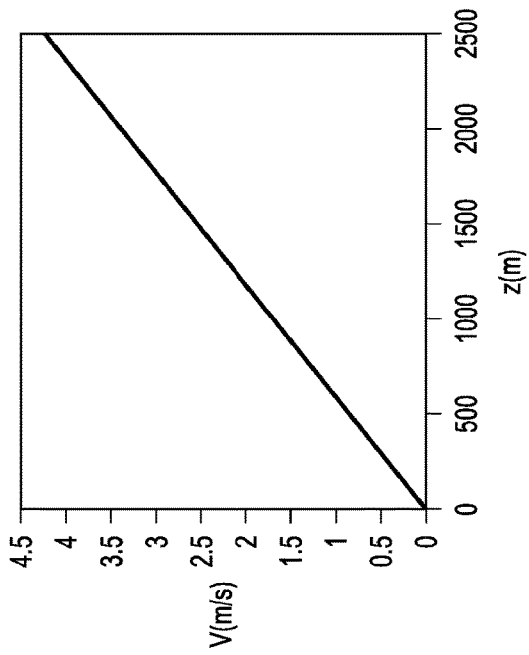
FIGS. 4A-4D are graphs that depict a second example in which a uniform injection flow rate profile j is applied to a horizontal injection well and the optimum flow control device properties are determined in accordance with the disclosed embodiments.
Figure 4B:
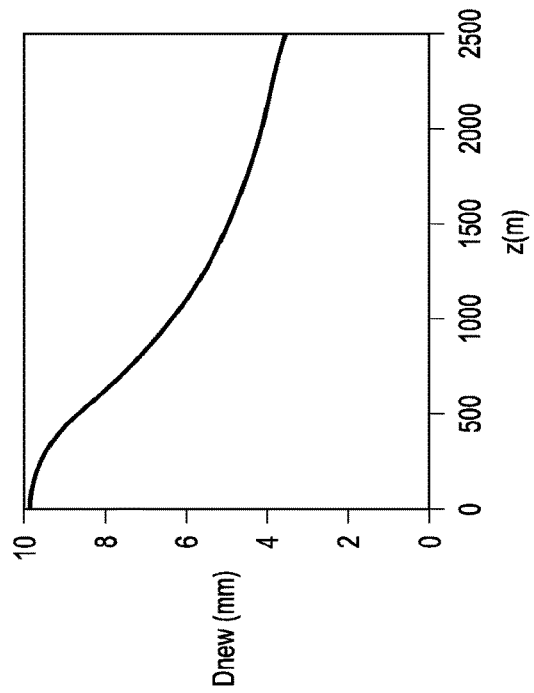
Figure 4C:
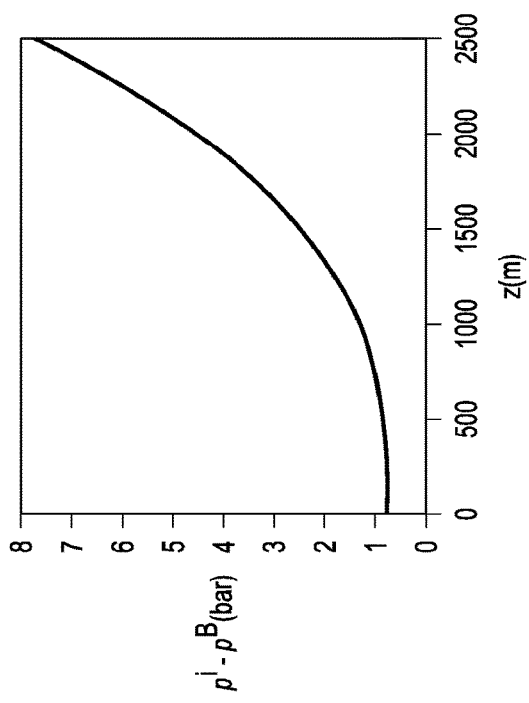
Figure 4D:
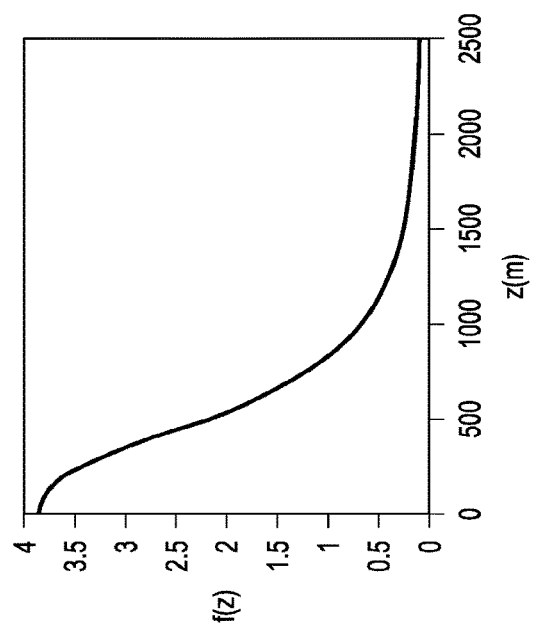

In the depicted example, the target injection flow rate is set constant along the wellbore. The disclosed process determines using Equation 1 that the velocity along the wellbore decreases linearly as shown in FIG. 4B. In addition, the process determines that the pressure drawdown $(p_i-p^B)$ decreases significantly from the heel to the toe of the wellbore as shown in FIG. 4A. Applying the disclosed process results in the calculated FCD distribution f(z) graph as shown in FIG. 4C. In one embodiment, if the distance $L_{or}$ is fixed to 12 m, the variation of the flow resistance coefficient σ (penetration factor) can be achieved by varying the hole diameter $D_{or}$ in accordance with Equation 9 and as depicted in FIG. 4D. In accordance with the depicted embodiment, the example simulation indicates a need for larger diameter FCDs near the toe and smaller diameter FCDs near the heel. In alternative embodiments/examples, the flow resistance coefficient σ can be adjusted by varying one or more of the FCD properties including the hole diameter $D_{or}$, the FCD distance $L_{or}$, as well as by adjusting the placement of FCDs of various designs in different parts of the well.

Figure 5A:
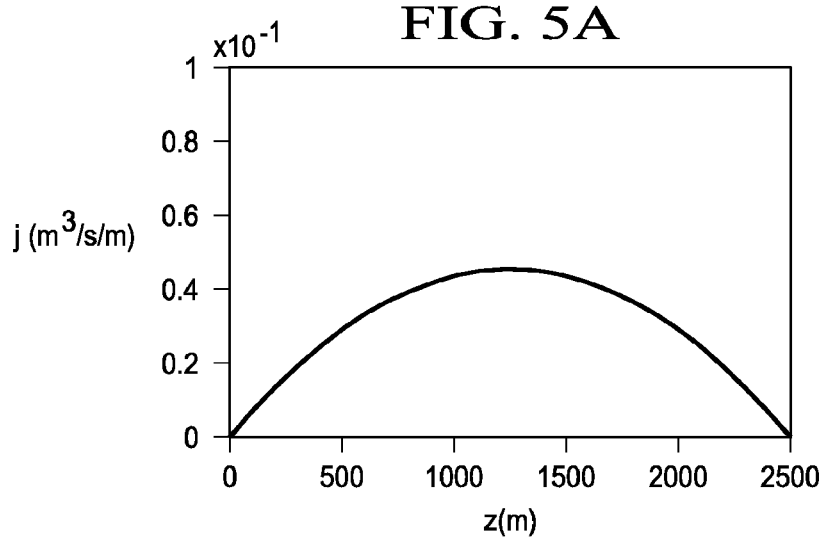
FIGS. 5A-5C are graphs that depict a third example in which an arbitrary prescribed injection profile j(z) is applied to a horizontal injection well and the optimum flow control device properties are determined in accordance with the disclosed embodiments.
Figure 5B:
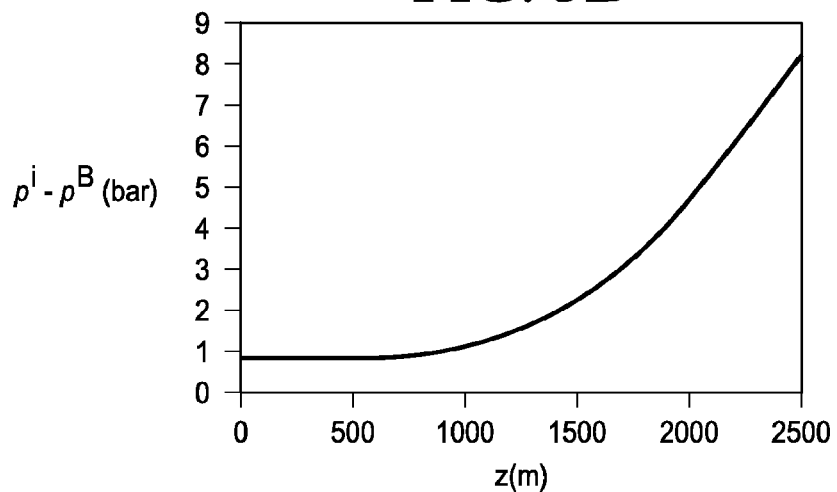
Figure 5C:
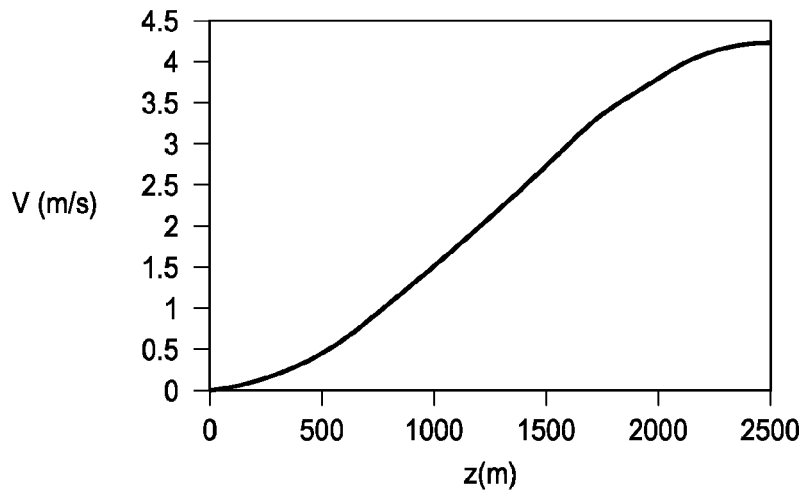

FIGS. 5A-5C are graphs that depict a third example with an arbitrary prescribed shape F(z) of the injection profile) in a horizontal injection well. For example, in the depicted embodiment, a parabolic shape of the target injection profile is chosen, described by equation, F(z)=0.25*z*(1−z) as shown in FIG. 5A. Certain wells may desire this type of injection profile rather than a uniform injection profile as used in the second example as the geological properties around the well may not be suitable for a uniform injection profile or the particular wellbore may not be parallel. In practice, the desired injection profile will be determined based on a variety of data including geological information, well drilling data, and the history of treatment of the well.

Figure 6A:
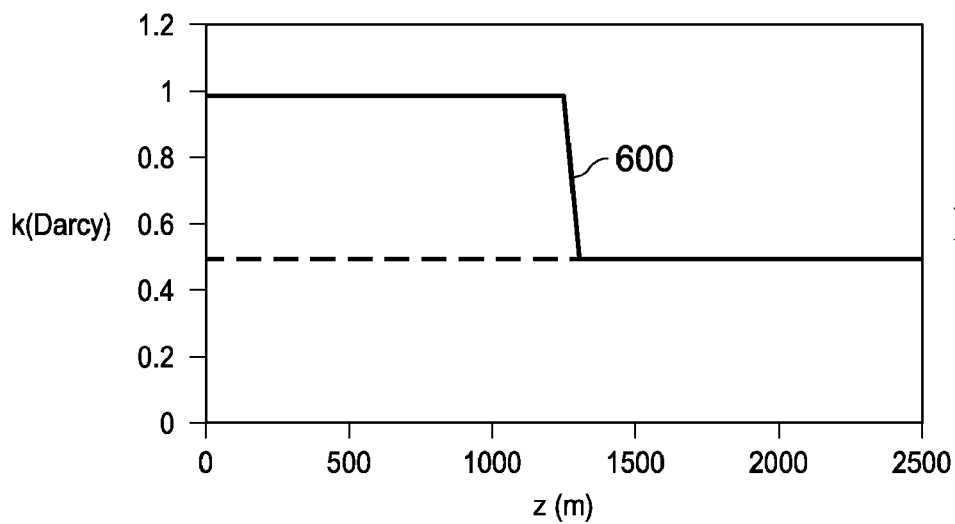
FIGS. 6A-6C are graphs that depict the variation of the water permeability k, the calculated flow control device distribution profile f(z), and the calculated flow control device diameter profiles based on the third example of FIGS. 5A-5C in accordance with the disclosed embodiments.
Figure 6B:
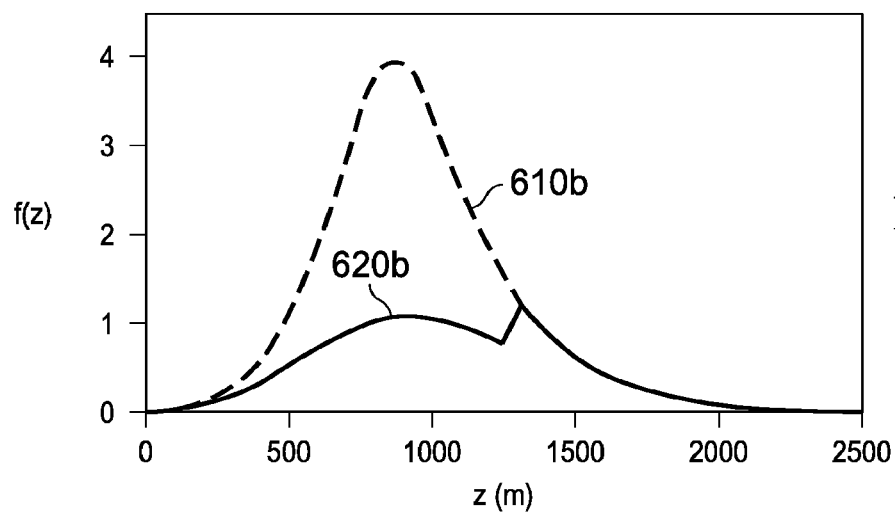
Figure 6C:
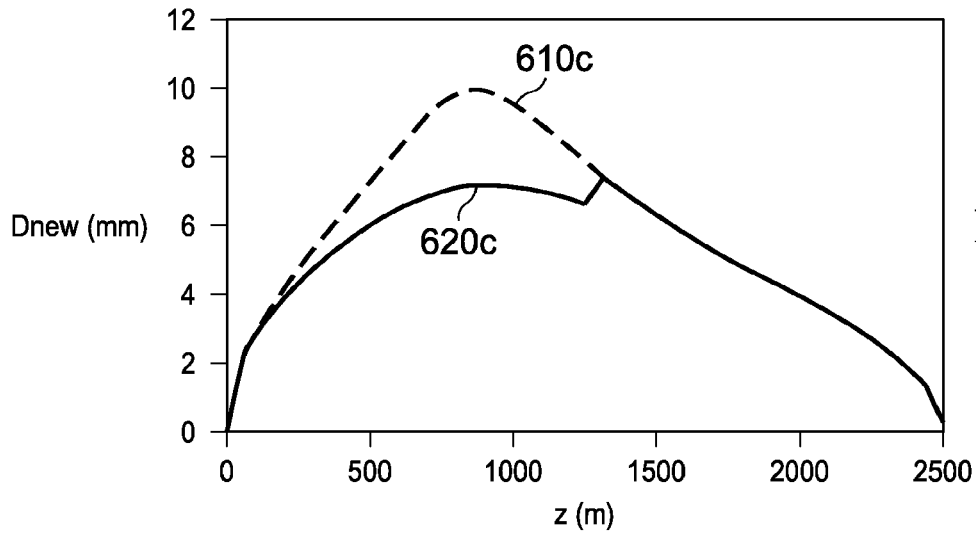

In the this example, an assumption is made that the reservoir is heterogeneous and that the permeability changes stepwise as shown by solid line 600 in FIG. 6A. FIGS. 5B and 5C illustrate the calculated pressure difference $(p^i-p^B)$ and velocity (V) profiles. Depending on the desired target injection profile j(z), this will result in the different FCD placements/properties. For instance, the application of described optimization process yields the FCD distribution functions as shown in FIG. 6B and nozzle size distributions as shown in FIG. 6C. In FIGS. 6B and 6C, the dash curves 610b and 610c correspond to constant permeability of reservoir k=0.5 Darcy everywhere, while the solid curves

620b and 620c represent that the injection fluid permeability changes step-wise from 1 Darcy to 0.5 Darcy at point z=1250 m as shown by solid line in FIG. 6A.

Figure 7:
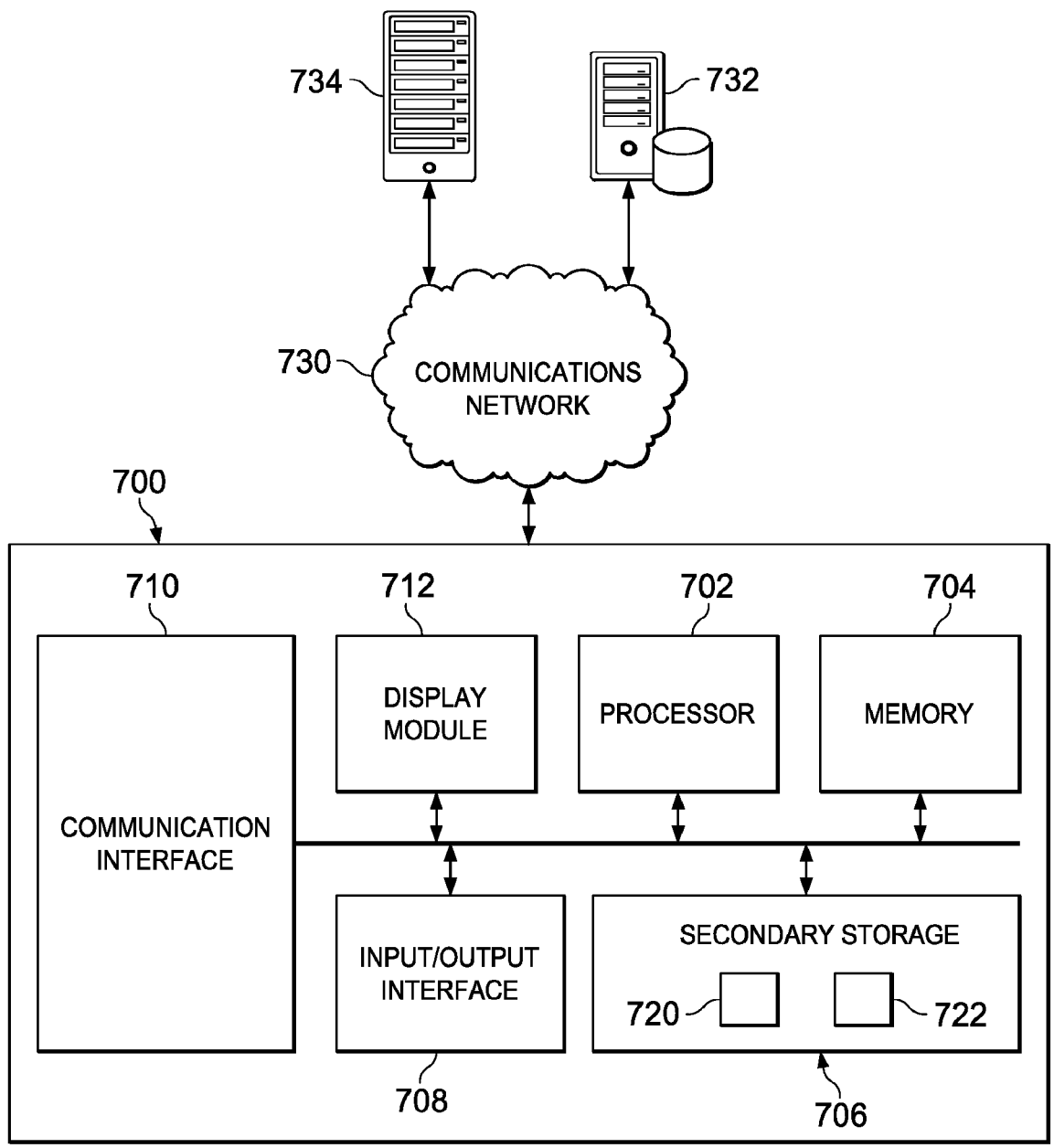
FIG. 7 is a block diagram illustrating one embodiment of a system for implementing the disclosed embodiments.

Referring now to FIG. 7, a block diagram illustrating one embodiment of a system 700 for implementing the features and functions of the disclosed embodiments is presented. The system 700 may be any type of computing device including, but not limited to, a desktop computer, a laptop, a server, a mainframe, a tablet, and a mobile device. The system 700 includes, among other components, a processor 702, memory 704, secondary storage unit 706, an input/output interface module 708, and a communication interface module 710.

The processor 702 may be any type microprocessor including single core and multi-core processors capable of executing instructions for performing the features and functions of the disclosed embodiments. The input/output interface module 708 enables the system 700 to receive user input (e.g., from a keyboard and mouse) and output information to one or more devices such as, but not limited to, printers, external data storage devices, and audio speakers. The system 700 may optionally include a separate display module 712 to enable information to be displayed on an integrated or external display device. For instance, the display module 712 may include instructions or hardware (e.g., a graphics card or chip) for providing enhanced graphics, touchscreen, and/or multi-touch functionalities associated with one or more display devices.

Memory 704 is volatile memory that stores currently executing instructions/data or instructions/data that are prefetched for execution. The secondary storage unit 706 is non-volatile memory for storing persistent data. The secondary storage unit 706 may be or include any type of data storage component such as a hard drive, a flash drive, or a memory card. In one embodiment, the secondary storage unit 706 stores the computer executable code/instructions and other relevant data for enabling a user to perform the features and functions of the disclosed embodiments.

For example, in accordance with the disclosed embodiments, the secondary storage unit 706 may permanently store executable code/instructions 720 for performing the above-described FCD optimization process. The instructions 720 associated with the FCD optimization process are then loaded from the secondary storage unit 706 to memory 704 during execution by the processor 702 for performing the disclosed embodiments. In addition, the secondary storage unit 706 may store other executable code/instructions and data 722 such as, but not limited to, a wellbore simulator application and/or a reservoir simulation application for use with the disclosed embodiments.

The communication interface module 710 enables the system 700 to communicate with the communications network 730. For example, the network interface module 708 may include a network interface card and/or a wireless transceiver for enabling the system 700 to send and receive data through the communications network 730 and/or directly with other devices.

The communications network 730 may be any type of network including a combination of one or more of the following networks: a wide area network, a local area network, one or more private networks, the Internet, a telephone network such as the public switched telephone network (PSTN), one or more cellular networks, and wireless data networks. The communications network 730 may include a plurality of network nodes (not depicted) such as routers, network access points/gateways, switches, DNS servers, proxy servers, and other network nodes for assisting in routing of data/communications between devices.

For example, in one embodiment, the system 700 may interact with one or more servers 734 or databases 732 for performing the features of the disclosed embodiments. For instance, the system 700 may query the database 732 for well log information for creating a coupled wellbore-reservoir model in accordance with the disclosed embodiments. Further, in certain embodiments, the system 700 may act as a server system for one or more client devices or a peer system for peer to peer communications or parallel processing with one or more devices/computing systems (e.g., clusters, grids).

Accordingly, the disclosed embodiments provide a system and computer implemented method that is able to determine, using a numerical algorithm, the optimum FCD placements in injection wells that will yield a uniform or targeted injection flow rate profile along a wellbore to prevent the premature breakthrough of the injection fluid. One advantage of the disclosed embodiments is that it can be applied to coupled wellbore-reservoir simulations of various complexity levels. Another advantage is that the disclosed process is computationally efficient as it is optimized for a specific set of problems and is much simpler than a universal optimization method. In addition, the disclosed process exhibits an excellent convergence as it does not involve the Lagrange multipliers and is reduced to one simulation. Further, the disclosed process can be easily applied to any coupled wellbore-reservoir model, including the most complicated ones.

As stated above, a traditional approach for FCD placement/optimization involves running multiple reservoir models and choosing the best design (which is usually good, but not optimal) from a set of simulations with different completion placements. In contrast, application of the disclosed embodiments would not only yield to the best placement/optimization design, but also substantially reduce the total computational effort.

In certain embodiments, the disclosed embodiments may be used to provide a very good initial guess for CPU-expensive simulations involving detailed 3D models (for example field reservoir simulations), thus saving days of simulation time. In one embodiment, the disclosed processes may be integrated into production simulation software package (e.g., NETool™). Moreover, the disclosed process is flexible enough to account for many physical phenomena and reservoir conditions that might be not captured by the reservoir simulator model but be seen in the formation from the log measurements.

While specific details about the above embodiments have been described, the above hardware and software descriptions are intended merely as example embodiments and are not intended to limit the structure or implementation of the disclosed embodiments. For instance, although many other internal components of the system 700 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present invention. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the embodiments described above, many examples of specific combinations are within the scope of the disclosure, some of which are detailed below.

Example 1 is a computer-implemented method for determining FCD properties that would yield to a prescribed injection flow rate profile for an injection well. The method comprising determining an injection flow rate profile based on a uniform distribution profile; determining a reference location along a production length of the injection well; determining a reference value equal to the injection flow rate profile at the reference location along the production length of the injection well; defining a target injection profile using the reference value; determining a pressure distribution along the production length of the injection well based on the target injection profile; determining a FCD distribution profile using the target injection profile and the pressure distribution; and determining FCD properties that yields the target injection profile based on the FCD distribution profile.

Example 2 is a computer-implemented method for determining FCD properties that would yield to a prescribed injection flow rate profile for an injection well. The method comprising determining an injection flow rate profile based on a uniform distribution profile; determining a reference location along a production length of the injection well, wherein the reference location along the injection well satisfies the following condition:

$$\frac{j(z_0)}{F(z_0)} = \min\left[\frac{j(z)}{F(z)}\right]; 0 \le z \le L_z;$$

determining a reference value equal to the injection flow rate profile at the reference location along the production length of the injection well; defining a target injection profile using the reference value; determining a pressure distribution along the production length of the injection well based on the target injection profile; determining a FCD distribution profile using the target injection profile and the pressure distribution; and determining FCD properties that yields the target injection profile based on the FCD distribution profile.

Example 3 is a computer-implemented method for determining FCD properties that would yield to a prescribed injection flow rate profile for an injection well. The method comprising determining an injection flow rate profile based on a uniform distribution profile, wherein determining the injection flow rate profile based on the uniform distribution profile includes integrating a continuity equation and a momentum balance equation along the production length of the injection well; determining a reference location along a production length of the injection well; determining a reference value equal to the injection flow rate profile at the reference location along the production length of the injection well; defining a target injection profile using the reference value; determining a pressure distribution along the production length of the injection well based on the target injection profile; determining a FCD distribution profile using the target injection profile and the pressure distribution; and determining FCD properties that yields the target injection profile based on the FCD distribution profile.

Example 4 is a computer-implemented method for determining FCD properties that would yield to a prescribed injection flow rate profile for an injection well. The method comprising determining an injection flow rate profile based on a uniform distribution profile, wherein determining the injection flow rate profile based on the uniform distribution profile includes integrating a continuity equation and a momentum balance equation along the production length of the injection well, wherein the continuity equation is:

$$\frac{dp}{dz} = \frac{j}{S}, \text{ wherein } j = \frac{2\pi k}{\mu} \frac{p^e(z) - p^B}{\ln\left(\frac{r_B}{r_0}\right)};$$

determining a reference location along a production length of the injection well; determining a reference value equal to the injection flow rate profile at the reference location along the production length of the injection well; defining a target injection profile using the reference value; determining a pressure distribution along the production length of the injection well based on the target injection profile; determining a FCD distribution profile using the target injection profile and the pressure distribution; and determining FCD properties that yields the target injection profile based on the FCD distribution profile.

Example 5 is a computer-implemented method for determining FCD properties that would yield to a prescribed injection flow rate profile for an injection well. The method comprising determining an injection flow rate profile based on a uniform distribution profile, wherein determining the injection flow rate profile based on the uniform distribution profile includes integrating a continuity equation and a momentum balance equation along the production length of the injection well, wherein the momentum equation is:

$$\frac{dp}{dz} = \frac{f_d}{2D}\rho|V|V + \frac{2\rho V j}{S} + \rho g_z;$$

determining a reference location along a production length of the injection well; determining a reference value equal to the injection flow rate profile at the reference location along the production length of the injection well; defining a target injection profile using the reference value; determining a pressure distribution along the production length of the injection well based on the target injection profile; determining a FCD distribution profile using the target injection profile and the pressure distribution; and determining FCD properties that yields the target injection profile based on the FCD distribution profile.

Example 6 is a computer-implemented method for determining FCD properties that would yield to a prescribed injection flow rate profile for an injection well. The method comprising determining an injection flow rate profile based on a uniform distribution profile; determining a reference location along a production length of the injection well; determining a reference value equal to the injection flow rate profile at the reference location along the production length of the injection well; defining a target injection profile using the reference value; determining a pressure distribution along the production length of the injection well based on the target injection profile; determining a FCD distribution profile using the target injection profile and the pressure distribution; and determining FCD properties that yields the target injection profile based on the FCD distribution profile.

Example 6 is a computer-implemented method for determining FCD properties that would yield to a prescribed injection flow rate profile for an injection well. The method comprising determining an injection flow rate profile based on a uniform distribution profile, wherein determining the injection flow rate profile based on the uniform distribution profile includes solving the equation:

$$j^2 = \frac{f(z)}{\sigma}[p^i(z) - p^e(z)];$$

determining a reference location along a production length of the injection well; determining a reference value equal to the injection flow rate profile at the reference location along the production length of the injection well; defining a target injection profile using the reference value; determining a pressure distribution along the production length of the injection well based on the target injection profile; determining a FCD distribution profile using the target injection profile and the pressure distribution; and determining FCD properties that yields the target injection profile based on the FCD distribution profile.

Example 7 is a computer-implemented method for determining FCD properties that would yield to a prescribed injection flow rate profile for an injection well. The method comprising determining an injection flow rate profile based on a uniform distribution profile; determining a reference location along a production length of the injection well; determining a reference value equal to the injection flow rate profile at the reference location along the production length of the injection well; defining a target injection profile using the reference value, wherein defining the target injection profile using the reference value uses the following equation: $j^*(Z)=j(Z_0) \cdot F(Z)/F(Z_0)$; determining a pressure distribution along the production length of the injection well based on the target injection profile; determining a FCD distribution profile using the target injection profile and the pressure distribution; and determining FCD properties that yields the target injection profile based on the FCD distribution profile.

Example 8 is a computer-implemented method for determining FCD properties that would yield to a prescribed injection flow rate profile for an injection well. The method comprising determining an injection flow rate profile based on a uniform distribution profile; determining a reference location along a production length of the injection well; determining a reference value equal to the injection flow rate profile at the reference location along the production length of the injection well; defining a target injection profile using the reference value; determining a pressure distribution along the production length of the injection well based on the target injection profile; determining a FCD distribution profile using the target injection profile and the pressure distribution; and determining FCD properties that yields the target injection profile based on the FCD distribution profile which includes determining various hole diameters of the FCDs along the production length of the injection well.

Example 9 is a computer-implemented method for determining FCD properties that would yield to a prescribed injection flow rate profile for an injection well. The method comprising determining an injection flow rate profile based on a uniform distribution profile; determining a reference location along a production length of the injection well; determining a reference value equal to the injection flow rate profile at the reference location along the production length of the injection well; defining a target injection profile using the reference value; determining a pressure distribution along the production length of the injection well based on the target injection profile; determining a FCD distribution profile using the target injection profile and the pressure distribution; and determining FCD properties that yields the target injection profile based on the FCD distribution profile, which includes determining a distance distribution of the FCDs along the production length of the injection well.

Example 10 is a computer-implemented method for determining FCD properties that would yield to a prescribed injection flow rate profile for an injection well. The method comprising determining an injection flow rate profile based on a uniform distribution profile; determining a reference location along a production length of the injection well; determining a reference value equal to the injection flow rate profile at the reference location along the production length of the injection well; defining a target injection profile using the reference value; determining a pressure distribution along the production length of the injection well based on the target injection profile; determining a FCD distribution profile using the target injection profile and the pressure distribution; and determining FCD properties that yields the target injection profile based on the FCD distribution profile, which includes determining various hole diameters of the FCDs and a distance distribution of the FCDs along the production length of the injection well.

Example 11 is a computer-implemented method for determining FCD properties that would yield to a prescribed injection flow rate profile for an injection well. The method comprising determining an injection flow rate profile based on a uniform distribution profile; determining a reference location along a production length of the injection well; determining a reference value equal to the injection flow rate profile at the reference location along the production length of the injection well; defining a target injection profile using the reference value; determining a pressure distribution along the production length of the injection well based on the target injection profile; determining a FCD distribution profile using the target injection profile and the pressure distribution; and determining FCD properties that yields the target injection profile based on the FCD distribution profile, which includes determining various hole diameters of the FCDs, a distance distribution of the FCDs, and various types of the FCDs along the production length of the injection well.

Example 12 is a system, comprising: at least one processor; and at least one memory coupled to the at least one processor and storing computer executable instructions for determining FCD properties that would yield to a prescribed injection flow rate profile for an injection well. The computer executable instructions comprises instructions for determining an injection flow rate profile based on a uniform distribution profile; determining a reference location along a production length of the injection well; determining a reference value equal to the injection flow rate profile at the reference location along the production length of the injection well; defining a target injection profile using the reference value; determining a pressure distribution along the production length of the injection well based on the target injection profile; determining a FCD distribution profile using the target injection profile and the pressure distribution; and determining FCD properties that yields the target injection profile based on the FCD distribution profile.

Example 13 is a system, comprising: at least one processor; and at least one memory coupled to the at least one processor and storing computer executable instructions for determining FCD properties that would yield to a prescribed injection flow rate profile for an injection well. The computer executable instructions comprises instructions for determining an injection flow rate profile based on a uniform distribution profile; determining a reference location along a production length of the injection well, wherein the reference location along the injection well satisfies the following condition:

$$\frac{j(z_0)}{F(z_0)} = \min\left[\frac{j(z)}{F(z)}\right]; 0 \le z \le L_z;$$

determining a reference value equal to the injection flow rate profile at the reference location along the production length of the injection well; defining a target injection profile using the reference value; determining a pressure distribution along the production length of the injection well based on the target injection profile; determining a FCD distribution profile using the target injection profile and the pressure distribution; and determining FCD properties that yields the target injection profile based on the FCD distribution profile.

Example 14 is a system, comprising: at least one processor; and at least one memory coupled to the at least one processor and storing computer executable instructions for determining FCD properties that would yield to a prescribed injection flow rate profile for an injection well. The computer executable instructions comprises instructions for determining an injection flow rate profile based on a uniform distribution profile, wherein determining the injection flow rate profile based on the uniform distribution profile includes integrating a continuity equation and a momentum balance equation along the production length of the injection well; determining a reference location along a production length of the injection well; determining a reference value equal to the injection flow rate profile at the reference location along the production length of the injection well; defining a target injection profile using the reference value; determining a pressure distribution along the production length of the injection well based on the target injection profile; determining a FCD distribution profile using the target injection profile and the pressure distribution; and determining FCD properties that yields the target injection profile based on the FCD distribution profile.

Example 15 is a system, comprising: at least one processor; and at least one memory coupled to the at least one processor and storing computer executable instructions for determining FCD properties that would yield to a prescribed injection flow rate profile for an injection well. The computer executable instructions comprises instructions for determining an injection flow rate profile based on a uniform distribution profile, wherein determining the injection flow rate profile based on the uniform distribution profile includes integrating a continuity equation and a momentum balance equation along the production length of the injection well, wherein the continuity equation is:

$$\frac{dp}{dz} = \frac{j}{S}, \text{wherin } j = \frac{2\pi k}{\mu} \frac{p^e(z) - p^B}{\ln\left(\frac{r_B}{r_0}\right)};$$

determining a reference location along a production length of the injection well; determining a reference value equal to the injection flow rate profile at the reference location along the production length of the injection well; defining a target injection profile using the reference value; determining a pressure distribution along the production length of the injection well based on the target injection profile; determining a FCD distribution profile using the target injection profile and the pressure distribution; and determining FCD properties that yields the target injection profile based on the FCD distribution profile.

Example 16 is a system, comprising: at least one processor; and at least one memory coupled to the at least one processor and storing computer executable instructions for determining FCD properties that would yield to a prescribed injection flow rate profile for an injection well. The computer executable instructions comprises instructions for determining an injection flow rate profile based on a uniform distribution profile, wherein determining the injection flow rate profile based on the uniform distribution profile includes integrating a continuity equation and a momentum balance equation along the production length of the injection well, wherein the momentum equation is:

$$\frac{dp}{dz} = \frac{f_d}{2D}\rho|V|V + \frac{2\rho V j}{S} + \rho g_z;$$

determining a reference location along a production length of the injection well; determining a reference value equal to the injection flow rate profile at the reference location along the production length of the injection well; defining a target injection profile using the reference value; determining a pressure distribution along the production length of the injection well based on the target injection profile; determining a FCD distribution profile using the target injection profile and the pressure distribution; and determining FCD properties that yields the target injection profile based on the FCD distribution profile.

Example 17 is a system, comprising: at least one processor; and at least one memory coupled to the at least one processor and storing computer executable instructions for determining FCD properties that would yield to a prescribed injection flow rate profile for an injection well. The computer executable instructions comprises instructions for determining an injection flow rate profile based on a uniform distribution profile; determining a reference location along a production length of the injection well; determining a reference value equal to the injection flow rate profile at the reference location along the production length of the injection well; defining a target injection profile using the reference value; determining a pressure distribution along the production length of the injection well based on the target injection profile; determining a FCD distribution profile using the target injection profile and the pressure distribution; and determining FCD properties that yields the target injection profile based on the FCD distribution profile.

Example 18 is a system, comprising: at least one processor; and at least one memory coupled to the at least one processor and storing computer executable instructions for determining FCD properties that would yield to a prescribed injection flow rate profile for an injection well. The computer executable instructions comprises instructions for determining an injection flow rate profile based on a uniform distribution profile, wherein determining the injection flow rate profile based on the uniform distribution profile includes solving the equation:

$$j^2 = \frac{f(z)}{\sigma}[p^i(z) - p_e(z)];$$

determining a reference location along a production length of the injection well; determining a reference value equal to the injection flow rate profile at the reference location along the production length of the injection well; defining a target injection profile using the reference value; determining a pressure distribution along the production length of the injection well based on the target injection profile; determining a FCD distribution profile using the target injection profile and the pressure distribution; and determining FCD properties that yields the target injection profile based on the FCD distribution profile.

Example 19 is a system, comprising: at least one processor; and at least one memory coupled to the at least one processor and storing computer executable instructions for determining FCD properties that would yield to a prescribed injection flow rate profile for an injection well. The computer executable instructions comprises instructions for determining an injection flow rate profile based on a uniform distribution profile; determining a reference location along a production length of the injection well; determining a reference value equal to the injection flow rate profile at the reference location along the production length of the injection well; defining a target injection profile using the reference value, wherein defining the target injection profile using the reference value uses the following equation: $j^*(Z)=j(Z_0)\cdot F(Z)/F(Z_0)$; determining a pressure distribution along the production length of the injection well based on the target injection profile; determining a FCD distribution profile using the target injection profile and the pressure distribution; and determining FCD properties that yields the target injection profile based on the FCD distribution profile.

Example 20 is a system, comprising: at least one processor; and at least one memory coupled to the at least one processor and storing computer executable instructions for determining FCD properties that would yield to a prescribed injection flow rate profile for an injection well. The computer executable instructions comprises instructions for determining an injection flow rate profile based on a uniform distribution profile; determining a reference location along a production length of the injection well; determining a reference value equal to the injection flow rate profile at the reference location along the production length of the injection well; defining a target injection profile using the reference value; determining a pressure distribution along the production length of the injection well based on the target injection profile; determining a FCD distribution profile using the target injection profile and the pressure distribution; and determining FCD properties that yields the target injection profile based on the FCD distribution profile, which includes determining various hole diameters of the FCDs along the production length of the injection well.

Example 21 is a system, comprising: at least one processor; and at least one memory coupled to the at least one processor and storing computer executable instructions for determining FCD properties that would yield to a prescribed injection flow rate profile for an injection well. The computer executable instructions comprises instructions for determining an injection flow rate profile based on a uniform distribution profile; determining a reference location along a production length of the injection well; determining a reference value equal to the injection flow rate profile at the reference location along the production length of the injection well; defining a target injection profile using the reference value; determining a pressure distribution along the production length of the injection well based on the target injection profile; determining a FCD distribution profile using the target injection profile and the pressure distribution; and determining FCD properties that yields the target injection profile based on the FCD distribution profile, which includes determining a distance distribution of the FCDs along the production length of the injection well.

Example 22 is a system, comprising: at least one processor; and at least one memory coupled to the at least one processor and storing computer executable instructions for determining FCD properties that would yield to a prescribed injection flow rate profile for an injection well. The computer executable instructions comprises instructions for determining an injection flow rate profile based on a uniform distribution profile; determining a reference location along a production length of the injection well; determining a reference value equal to the injection flow rate profile at the reference location along the production length of the injection well; defining a target injection profile using the reference value; determining a pressure distribution along the production length of the injection well based on the target injection profile; determining a FCD distribution profile using the target injection profile and the pressure distribution; and determining FCD properties that yields the target injection profile based on the FCD distribution profile, which includes determining various hole diameters of the FCDs and a distance distribution of the FCDs along the production length of the injection well.

Example 23 is a system, comprising: at least one processor; and at least one memory coupled to the at least one processor and storing computer executable instructions for determining FCD properties that would yield to a prescribed injection flow rate profile for an injection well. The computer executable instructions comprises instructions for determining an injection flow rate profile based on a uniform distribution profile; determining a reference location along a production length of the injection well; determining a reference value equal to the injection flow rate profile at the reference location along the production length of the injection well; defining a target injection profile using the reference value; determining a pressure distribution along the production length of the injection well based on the target injection profile; determining a FCD distribution profile using the target injection profile and the pressure distribution; and determining FCD properties that yields the target injection profile based on the FCD distribution profile, which includes determining various hole diameters of the FCDs, a distance distribution of the FCDs, and various types of the FCDs along the production length of the injection well.

Example 24 is a non-transitory computer readable medium comprising computer executable instructions for determining FCD properties that would yield to a prescribed injection flow rate profile for an injection well. The computer executable instructions comprises instructions for determining an injection flow rate profile based on a uniform distribution profile; determining a reference location along a production length of the injection well; determining a reference value equal to the injection flow rate profile at the reference location along the production length of the injection well; defining a target injection profile using the reference value; determining a pressure distribution along the production length of the injection well based on the target injection profile; determining a FCD distribution profile using the target injection profile and the pressure distribution; and determining FCD properties that yields the target injection profile based on the FCD distribution profile.

Example 25 is a non-transitory computer readable medium comprising computer executable instructions for determining FCD properties that would yield to a prescribed shape F(z) of the injection flow rate profile for an injection well. The computer executable instructions comprises instructions for determining an injection flow rate profile based on a uniform distribution profile; determining a reference location along a production length of the injection well, wherein the reference location along the injection well satisfies the following condition:

$$\frac{j(z_0)}{F(z_0)} = \min\left[\frac{j(z)}{F(z)}\right]; 0 \leq z \leq L_z;$$

determining a reference value equal to the injection flow rate profile at the reference location along the production length of the injection well; defining a target injection profile using the reference value; determining a pressure distribution along the production length of the injection well based on the target injection profile; determining a FCD distribution profile using the target injection profile and the pressure distribution; and determining FCD properties that yields the target injection profile based on the FCD distribution profile.

Example 26 is a non-transitory computer readable medium comprising computer executable instructions for determining FCD properties that would yield to a prescribed injection flow rate profile for an injection well. The computer executable instructions comprises instructions for determining an injection flow rate profile based on a uniform distribution profile, wherein determining the injection flow rate profile based on the uniform distribution profile includes integrating a continuity equation and a momentum balance equation along the production length of the injection well; determining a reference location along a production length of the injection well; determining a reference value equal to the injection flow rate profile at the reference location along the production length of the injection well; defining a target injection profile using the reference value; determining a pressure distribution along the production length of the injection well based on the target injection profile; determining a FCD distribution profile using the target injection profile and the pressure distribution; and determining FCD properties that yields the target injection profile based on the FCD distribution profiles.

Example 27 is a non-transitory computer readable medium comprising computer executable instructions for determining FCD properties that would yield to a prescribed injection flow rate profile for an injection well. The computer executable instructions comprises instructions for determining an injection flow rate profile based on a uniform distribution profile, wherein determining the injection flow rate profile based on the uniform distribution profile includes integrating a continuity equation and a momentum balance equation along the production length of the injection well, wherein the continuity equation is:

$$\frac{dp}{dz} = \frac{j}{S}, \text{wherin } j = \frac{2\pi k}{\mu} \frac{p^e(z) - p^B}{\ln\left(\frac{r_B}{r_0}\right)};$$

determining a reference location along a production length of the injection well; determining a reference value equal to the injection flow rate profile at the reference location along the production length of the injection well; defining a target injection profile using the reference value; determining a pressure distribution along the production length of the injection well based on the target injection profile; determining a FCD distribution profile using the target injection profile and the pressure distribution; and determining FCD properties that yields the target injection profile based on the FCD distribution profiles.

Example 28 is a non-transitory computer readable medium comprising computer executable instructions for determining FCD properties that would yield to a prescribed injection flow rate profile for an injection well. The computer executable instructions comprises instructions for determining an injection flow rate profile based on a uniform distribution profile, wherein determining the injection flow rate profile based on the uniform distribution profile includes integrating a continuity equation and a momentum balance equation along the production length of the injection well, wherein the momentum equation is:

$$\frac{dp}{dz} = \frac{f_d}{2D}\rho|V|V + \frac{2\rho V j}{S} + \rho g_z;$$

determining a reference location along a production length of the injection well; determining a reference value equal to the injection flow rate profile at the reference location along the production length of the injection well; defining a target injection profile using the reference value; determining a pressure distribution along the production length of the injection well based on the target injection profile; determining a FCD distribution profile using the target injection profile and the pressure distribution; and determining FCD properties that yields the target injection profile based on the FCD distribution profiles.

Example 29 is a non-transitory computer readable medium comprising computer executable instructions for determining FCD properties that would yield to a prescribed injection flow rate profile for an injection well. The computer executable instructions comprises instructions for determining an injection flow rate profile based on a uniform distribution profile; determining a reference location along a production length of the injection well; determining a reference value equal to the injection flow rate profile at the reference location along the production length of the injection well; defining a target injection profile using the reference value; determining a pressure distribution along the production length of the injection well based on the target injection profile; determining a FCD distribution profile using the target injection profile and the pressure distribution; and determining FCD properties that yields the target injection profile based on the FCD distribution profile.

Example 30 is a non-transitory computer readable medium comprising computer executable instructions for determining FCD properties that would yield to a prescribed injection flow rate profile for an injection well. The computer executable instructions comprises instructions for determining an injection flow rate profile based on a uniform distribution profile, wherein determining the injection flow rate profile based on the uniform distribution profile includes solving the equation:

$$j^2 = \frac{f(z)}{\sigma}[p^i(z) - p^e(z)];$$

determining a reference location along a production length of the injection well; determining a reference value equal to the injection flow rate profile at the reference location along the production length of the injection well; defining a target injection profile using the reference value; determining a pressure distribution along the production length of the injection well based on the target injection profile; determining a FCD distribution profile using the target injection profile and the pressure distribution; and determining FCD properties that yields the target injection profile based on the FCD distribution profile.

Example 31 is a non-transitory computer readable medium comprising computer executable instructions for determining FCD properties that would yield to a prescribed injection flow rate profile for an injection well. The computer executable instructions comprises instructions for determining an injection flow rate profile based on a uniform FCD distribution profile; determining a reference location along a production length of the injection well; determining a reference value equal to the injection flow rate profile at the reference location along the production length of the injection well; defining a target injection profile using the reference value, wherein defining the target injection profile using the reference value uses the following equation: $j^*(Z)=j(Z_0)\cdot F(Z)/F(Z_0)$; determining a pressure distribution along the production length of the injection well based on the target injection profile; determining a FCD distribution profile using the target injection profile and the pressure distribution; and determining FCD properties that yields the target injection profile based on the FCD distribution profile.

Example 32 is a non-transitory computer readable medium comprising computer executable instructions for determining FCD properties that would yield to a prescribed injection flow rate profile for an injection well. The computer executable instructions comprises instructions for determining an injection flow rate profile based on a uniform FCD distribution profile; determining a reference location along a production length of the injection well; determining a reference value equal to the injection flow rate profile at the reference location along the production length of the injection well; defining a target injection profile using the reference value; determining a pressure distribution along the production length of the injection well based on the target injection profile; determining a FCD distribution profile using the target injection profile and the pressure distribution; and determining FCD properties that yields the target injection profile based on the FCD distribution profile, which includes determining various hole diameters of the FCDs along the production length of the injection well.

Example 33 is a non-transitory computer readable medium comprising computer executable instructions for determining FCD properties that would yield to a prescribed injection flow rate profile for an injection well. The computer executable instructions comprises instructions for determining an injection flow rate profile based on a uniform FCD distribution profile; determining a reference location along a production length of the injection well; determining a reference value equal to the injection flow rate profile at the reference location along the production length of the injection well; defining a target injection profile using the reference value; determining a pressure distribution along the production length of the injection well based on the target injection profile; determining a FCD distribution profile using the target injection profile and the pressure distribution; and determining FCD properties that yields the target injection profile based on the FCD distribution profile, which includes determining a distance distribution of the FCDs along the production length of the injection well.

Example 34 is a non-transitory computer readable medium comprising computer executable instructions for determining FCD properties that would yield to a prescribed FCD injection flow rate profile for an injection well. The computer executable instructions comprises instructions for determining an injection flow rate profile based on a uniform distribution profile; determining a reference location along a production length of the injection well; determining a reference value equal to the injection flow rate profile at the reference location along the production length of the injection well; defining a target injection profile using the reference value; determining a pressure distribution along the production length of the injection well based on the target injection profile; determining a FCD distribution profile using the target injection profile and the pressure distribution; and determining FCD properties that yields the target injection profile based on the FCD distribution profile, which includes determining various hole diameters of the FCDs and a distance distribution of the FCDs along the production length of the injection well.

Example 35 is a non-transitory computer readable medium comprising computer executable instructions for determining FCD properties that would yield to a prescribed injection flow rate profile for an injection well. The computer executable instructions comprises instructions for determining an injection flow rate profile based on a uniform distribution profile; determining a reference location along a production length of the injection well; determining a reference value equal to the injection flow rate profile at the reference location along the production length of the injection well; defining a target injection profile using the reference value; determining a pressure distribution along the production length of the injection well based on the target injection profile; determining a FCD distribution profile using the target injection profile and the pressure distribution; and determining FCD properties that yields the target injection profile based on the FCD distribution profile, which includes determining various hole diameters of the FCDs, a distance distribution of the FCDs, and various types of the FCDs along the production length of the injection well.

While many specific example embodiments are described above, the above examples are not intended to be exhaustive or limit the invention in the form disclosed. Many modifications and variations will be apparent to those of ordinary skill in the art without departing from the scope and spirit of the invention. The scope of the claims is intended to broadly cover the disclosed embodiments and any such modification.

The invention claimed is:

1. A computer implemented method for determining flow control device (FCD) properties that would yield a prescribed shape $F(z)$ of an injection flow rate profile for an injection well within a formation, the method comprising:

initializing, by a computer system, a FCD distribution function according to a uniform distribution profile for flow control devices along the injection well;

simulating, by the computer system, a flow of fluid injected from the injection well into the formation to determine the injection flow rate profile for the injection well, based on the initialized FCD distribution function;

determining, by the computer system, a reference location along a production length of the injection well, based on the injection flow rate profile determined from the simulation relative to the prescribed shape of the injection flow rate profile for the injection well;

determining a reference value equal to the injection flow rate profile at the reference location along the production length of the injection well;

defining a target injection profile for balancing the injected fluid flow into the formation using the reference value;

determining a pressure distribution along the production length of the injection well based on the target injection profile;

adjusting the FCD distribution function using the target injection profile and the pressure distribution;

determining FCD properties that yield the target injection profile along the injection well, based on the adjusted FCD distribution function, the FCD properties including a placement of the flow control devices along the injection well; and controlling an actual flow of fluid injected into the formation using the flow control devices along the injection well, based on the determined FCD properties.

2. The computer implemented method of claim 1, wherein the reference location along the injection well satisfies the following condition:

$$\frac{j(z_0)}{F(z_0)} = \min\left[\frac{j(z)}{F(z)}\right]; 0 \le z \le L_z.$$

3. The computer implemented method of claim 1, wherein the simulation to determine the injection flow rate profile based on the uniform distribution profile includes integrating a continuity equation and a momentum balance equation along the production length of the injection well.

4. The computer implemented method of claim 3, wherein the continuity equation is:

$$\frac{dp}{dz} = \frac{j}{S}, \text{wherin } j = \frac{2\pi k}{\mu} \frac{p^e(z) - p^B}{\ln\left(\frac{r_B}{r_0}\right)}.$$

5. The computer implemented method of claim 3, wherein the momentum equation is:

$$\frac{dp}{dz} = \frac{f_d}{2D}\rho |V| V + \frac{2\rho V j}{S} + \rho g_z.$$

6. The computer implemented method of claim 1, wherein the simulation to determine the injection flow rate profile is based on the uniform distribution profile and the equation:

$$j^2 = \frac{f(z)}{\sigma}[p^i(z) - p_e(z)].$$

7. The computer implemented method of claim 1, wherein defining the target injection profile using the reference value uses the following equation:

$$j^*(Z) = j(Z0) \cdot F(Z)/F(Z0).$$

8. The computer implemented method of claim 1, wherein determining FCD properties includes determining various hole diameters of the FCDs along the production length of the injection well.

9. The computer implemented method of claim 1, wherein determining FCD properties includes determining a distance distribution of the FCDs along the production length of the injection well.

10. A system, comprising:
at least one processor; and
at least one memory coupled to the at least one processor, the at least one memory storing processor-executable instructions, which, when executed by the at least one processor, causes the at least one processor to perform operations comprising:
initializing a FCD distribution function according to a uniform distribution profile for flow control devices along the injection well;
simulating a flow of fluid injected from the injection well into the formation to determine an injection flow rate profile for an injection well, based on the initialized FCD distribution function;
determining a reference location along a production length of the injection well, based on the injection flow rate profile determined from the simulation relative to a prescribed shape of the injection flow rate profile for the injection well;
determining a reference value equal to the injection flow rate profile at the reference location along the production length of the injection well;
defining a target injection profile for balancing the injected fluid flow into the formation using the reference value;
determining a pressure distribution along the production length of the injection well based on the target injection profile;
adjusting the FCD distribution function using the target injection profile and the pressure distribution;
determining FCD properties that yield the target injection profile along the injection well, based on the adjusted FCD distribution function, the FCD properties including a placement of the flow control devices along the injection well; and
controlling an actual flow of fluid injected into the formation using the flow control devices along the injection well in accordance with the determined FCD properties.

11. The system of claim 10, wherein the reference location along the injection well satisfies the following condition:

$$\frac{j(z_0)}{F(z_0)} = \min\left[\frac{j(z)}{F(z)}\right]; 0 \le z \le L_z.$$

12. The system of claim 10, wherein the simulation to determine the injection flow rate profile based on the uniform distribution profile includes integrating a continuity equation and a momentum balance equation along the production length of the injection well.

13. The system of claim 12, wherein the continuity equation is:

$$\frac{dp}{dz} = \frac{j}{S}, \text{ wherin } j = \frac{2\pi k}{\mu}\frac{p^e(z) - p^B}{\ln\left(\frac{r_B}{r_0}\right)}.$$

14. The system of claim 12, wherein the momentum equation is:

$$\frac{dp}{dz} = \frac{f_d}{2D}\rho|V|V + \frac{2\rho Vj}{S} + \rho g_z.$$

15. The system of claim 10, wherein the simulation to determine the injection flow rate profile is based on the uniform distribution profile and the equation:

$$j^2 = \frac{f(z)}{\sigma}[p^i(z) - p_e(z)].$$

16. The system of claim 10, wherein defining the target injection profile using the reference value uses the following equation:

$$j^*(Z) = j(Z0) \cdot F(Z)/F(Z0).$$

17. The system of claim 10, wherein determining FCD properties includes determining various hole diameters of the FCDs along the production length of the injection well.

18. The system of claim 10, wherein determining FCD properties includes determining a distance distribution of the FCDs along the production length of the injection well.

19. A non-transitory computer readable medium comprising computer executable instructions, which, when executed by a computer, causes the computer to perform operations comprising:

initializing a FCD distribution function according to a uniform distribution profile for flow control devices along the injection well;

simulating a flow of fluid injected from the injection well into the formation to determine an injection flow rate profile for the injection well, based on the initialized FCD distribution function;

determining a reference location along a production length of the injection well, based on the injection flow rate profile determined from the simulation relative to the prescribed shape of the injection flow rate profile for the injection well;

determining a reference value equal to the injection flow rate profile at the reference location along the production length of the injection well;

defining a target injection profile for balancing the injected fluid flow into the formation using the reference value;

determining a pressure distribution along the production length of the injection well based on the target injection profile;

adjusting the FCD distribution function using the target injection profile and the pressure distribution;

determining FCD properties that yield the target injection profile along the injection well, based on the adjusted FCD distribution function, the FCD properties including a placement of the flow control devices along the injection well; and controlling an actual flow of fluid injected into the formation using the flow control devices along the injection well in accordance with the determined FCD properties.

20. The non-transitory computer readable medium of claim 19, wherein determining RD properties includes determining various hole diameters of the FCDs along the production length of the injection well.

* * * * *

UNITED STATES PATENT AND TRADEMARK OFFICE
CERTIFICATE OF CORRECTION

PATENT NO. : 10,619,457 B2
APPLICATION NO. : 15/033572
DATED : April 14, 2020
INVENTOR(S) : Andrey Filippov, Jianxin Lu and Vitaly Khoriakov It is certified that error appears in the above-identified patent and that said Letters Patent is hereby corrected as shown below:

Column 22, Line 2, change:

$$j^2 = \frac{f(z)}{\sigma}[p^i(z) - p_e(z)]$$

To:

$$j^2 = \frac{f(z)}{\sigma}\left[p^i(z) - p^e(z)\right]$$

Column 23, Line 24, change:

$$j^2 = \frac{f(z)}{\sigma}[p^i(z) - p_e(z)]$$

To:

$$j^2 = \frac{f(z)}{\sigma}\left[p^i(z) - p^e(z)\right]$$

Signed and Sealed this
Twentieth Day of October, 2020

Andrei Iancu
*Director of the United States Patent and Trademark Office*